United States Patent [19]

Lichtman

[11] Patent Number: 4,652,099
[45] Date of Patent: Mar. 24, 1987

[54] SCLERAL RING

[76] Inventor: William M. Lichtman, Natl. Contact Lens Center, 1510 Chestnut St., Philadelphia, Pa. 19102

[21] Appl. No.: 615,364

[22] Filed: May 30, 1984

[51] Int. Cl.[4] .................................................. G02C 7/04
[52] U.S. Cl. .................................. 351/162; 351/160 H
[58] Field of Search ............... 351/160 H, 160 R, 161, 351/162; 623/4, 5

[56] References Cited

U.S. PATENT DOCUMENTS 3,679,504  7/1972  Wichterle ............................ 351/162
4,157,864  6/1979  Koller et al. ..................... 351/160 H

FOREIGN PATENT DOCUMENTS 882004  7/1953  Fed. Rep. of Germany ...... 351/162

OTHER PUBLICATIONS

Hoffmannbeck, W.; "Painted Plastic Contact Lenses"; *Contacto;* vol. 10, No. 4, Dec. 1966, pp. 15–19.

Primary Examiner—John K. Corbin
Assistant Examiner—Scott J. Sugarman

[57] ABSTRACT

A scleral ring of hydrophilic material 0.05 to 0.35 millimeters thick is provided with a circular shape about 16 to 25 millimeters in diameter, or a generally elliptical shape approximately 24 to 30 millimeters long and approximately 12 to 18 millimeters in width, also a central portion of about 9 to 15 millimeters in diameter. There is also a peripheral portion disposed about said central portion colored white, whereby the exposed portion of the wearer's sclera is cosmetically treated. The central portion may have an optical center about 5 millimeters in diameter, preferably of optical quality for the correction of vision or clear or removed.

12 Claims, 4 Drawing Figures

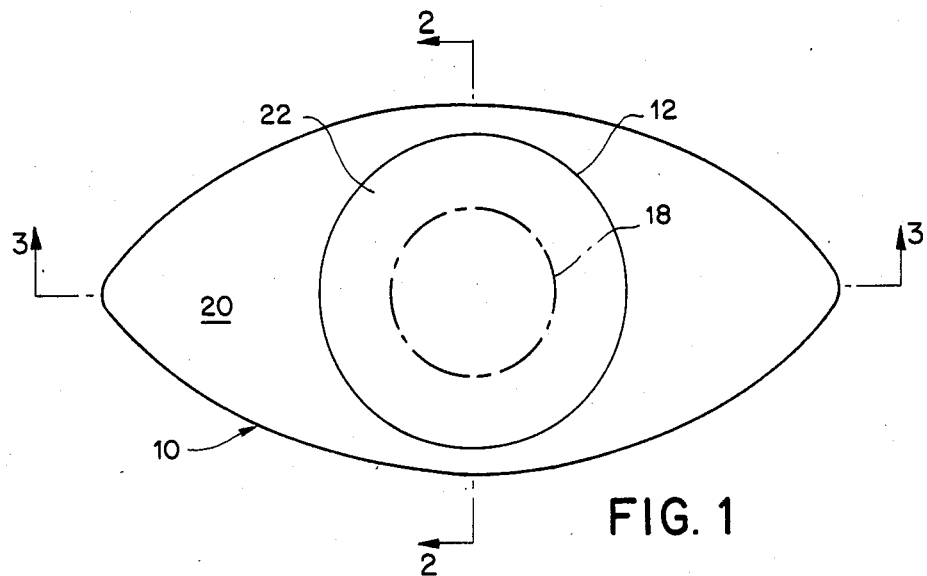
FIG. 1
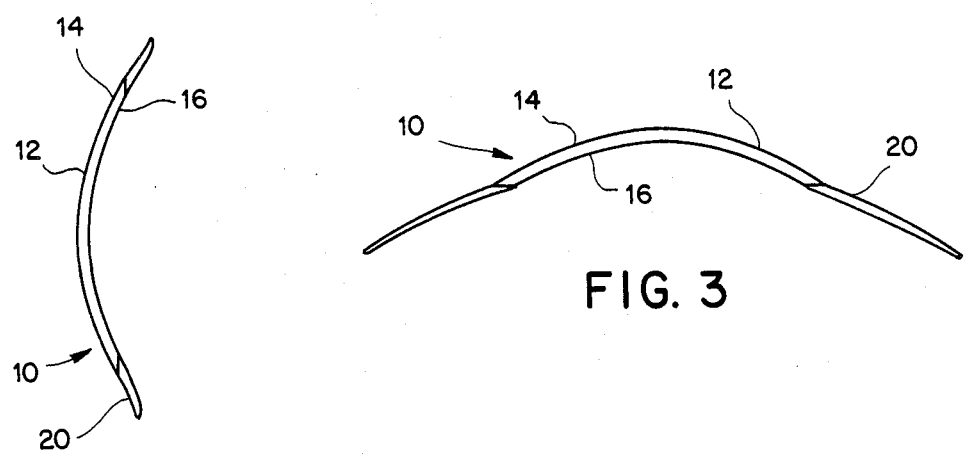
FIG. 2
FIG. 3

SCLERAL RING

This invention relates to a scleral ring overaly made from hydrophilic material and having special coloring for cosmetic purposes.

It is well known to provide hard contact lenses having a wide variety of constructions in order to overlay the wearer's iris with color. Although it is also worn on the eye, the scleral ring of the present invention differs from colored contact lenses in many respects, among which is that it is applied to soft material and constructed to overlay the sclera or white of the eye.

This invention seeks to provide a soft scleral ring which overlays the exposed portion of the wearer's sclera with white color for cosmetic purposes.

According to the present invention, scleral ring overlay of hydrophilic material is provided with a generally elliptical shape about 16 to 25 millimeters long and 12 to 18 millimeters wide, or with a circular shape about 16 to 25 millimeters in diameter. The scleral ring overlay comprises a central portion about 9 to 15 millimeters in diameter and a peripheral portion disposed about said central portion. The peripheral portion overlays the exposed portion of the wearer's sclera and it is colored white or other cosmetic shades for cosmetic effect in order to hide yellow, bloodshot, or an otherwise unattractive white of the eye.

Still further according to the invention, the central portion of the scleral ring may have an optical center about 5 millimeters in diameter, preferably of optical quality for the correction of vision; however it may be clear or removed if correction of vision is not desired or for other reasons.

DRAWINGS

In the drawings:

FIG. 1 is a frontal view of a scleral ring overlay made according to the present invention.

FIG. 2 is a sectional view taken along line 2—2 of FIG. 1, further illustrating the invention.

FIG. 3 is another sectional view of the scleral ring overlay of FIG. 1, taken along line 3—3 thereof.

DESCRIPTION OF THE PREFERRED EMBODIMENT

Figure 4:
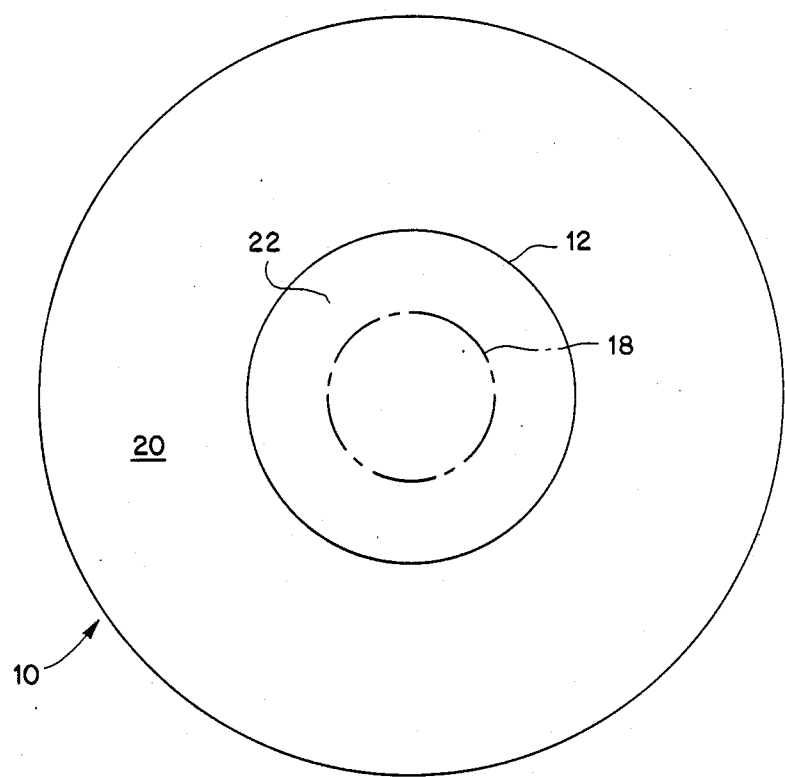
FIG. 4 is a frontal view of a modified scleral ring embodying the invention, it being understood that a sectional view thereof would correspond to FIG. 3.

As shown in the drawings, the present invention is preferably embodied in a scleral ring overlay 10 made of hydrophilic material about 0.05 to 0.35 millimeters thick, but it is also applicable to overlays of other materials or of other thicknesses suitable for wear on the cornea.

It is desired that the overlay 10 fit on the cornea and fill the exposed space between the wearer's open eyelids, and for this purpose the overlay of FIG. 1 is generally of elliptical shape having a length in the range of between 16 and 25 millimeters, depending upon the size and shape of the wearer's eye.

The width of the overlay in FIG. 1 is approximately 12 to 18 millimeters in width, or about 75% of its length, and again this dimension is suited to the size and shape of the wearer's eye.

In or about the center of overlay 10 shown in FIG. 1 is a central portion 12 of circular configuration having a diameter of approximately 9 to 15 millimeters. As best seen in FIGS. 2 and 3, the central portion 12 is convex on its exposed suface 14 and concave on its opposite, inner surface 16, with a radius of curvature suited for wear on the cornea. The radii of curvature of the surfaces 14, 16 are also selected in a well known manner in order to provide the central portion 12 with optical quality at least at its center 18 (designated in broken lines) overlying the wearer's pupillary area, for the correction of vision.

Disposed about the central portion 12 and extending to the surrounding edge of the overlay 10 is a peripheral portion 20 which is an extension of the convex and concave surfaces 14, 16, although on a flatter radius of curvature as shown in FIG. 3, in order to fit closely the wearer's sclera. The peripheral portion 20 is colored white, preferably matching the color of a normal, healthy, human sclera; however, other cosmetic shades may be used if desired. As a result, a cosmetic effect is achieved if the natural color of the wearer's sclera is yellow or jaundiced, or bloodshot, or otherwise unattractively discolored.

MODIFICATIONS

If desired, the overlay 10 may be circular rather than elliptical in shape, preferably 16 to 25 millimeters in diameter, as shown in FIG. 4. This dimension corresponds to the preferred length of an elliptical scleral ring overlay stated above. In FIG. 4, like reference numerals are used to designate parts of the modified overlay that are of substantially the same construction as parts of the preferred embodiment designated in FIG. 1 by the same reference numeral. Overlays of circular configuration are likely to overlay more of the sclera than its normally exposed portions.

The annular portion 22 overlies the wearer's pupillary area and the central area 18 registers with the lens of the wearer's eye; and in combination with the peripheral portion 20 the scleral ring overlay conforms to the anatomical shape of the eye. As with the embodiment of FIG. 1, the peripheral portion 20 has a flatter curvature, being on a larger radius of curvature than the central portion 12.

In the event that no optical correction is desired, it is optional in either embodiment, according to the present invention, to remove the central portion 12 so that only the peripheral portion 20 is left for covering the exposed portion of the wearer's sclera. As a further option, only the optical center 18 may be removed so that the annular portion 22 remains with the peripheral portion 20 as an overlay.

Although the invention has been described in preferred and modified form, further modifications will be obvious to those skilled in the art which will consitute practice of the present invention.

What is claimed is:

1. A scleral ring overlay of hydrophilic material at least in the range of 16 to 25 millimeters long, having a central portion of about 9 to 15 millimetrs in diameter, and a peripheral portion disposed about said central portion colored white, whereby the exposed portion of the wearer's sclera is cosmetically treated.

2. A scleral ring overlay according to claim 1 of generally elliptical shape being in the range of between 12 to 18 millimeters wide.

3. A scleral ring overlay according to claim 1 of generally elliptical shape wherein its width is about 75% of its length.

4. A scleral ring overlay according to claim 1 of circular shape being 16 to 25 millimeters in diameter.

5. A scleral ring overlay according to claim 1 wherein said central portion is provided with a center of optical quality about 5 millimeters in diameter.

6. A scleral ring overlay according to claim 5 wherein said center is a lens of optical quality for the correction of vision.

7. A scleral ring overlay according to claim 1 being approximately 0.05 to 0.35 millimeters thick.

8. A scleral ring overlay according to claim 5 wherein said center is made of clear material.

9. A scleral ring overlay according to claim 1 wherein said central portion is removed to provide a central opening in said lens.

10. A scleral ring overlay according to claim 1 wherein said center is removed to provide a central opening in said lens.

11. A scleral ring overlay according to claim 1 wherein the surface of said overlay is curved to conform to the anatomical shape of the eye.

12. A scleral ring overlay having a thickness of about 0.05 to 0.35 millimeters, said overlay being curved to conform to the shape of the eye, made of hydrophilic material with generally elliptical shape in the range of between 16 to 25 millimeters long and 12 to 18 millimeters wide, with its width about 75% of its length, having a central portion of about 9 to 15 millimeters in diameter, and a peripheral portion disposed about said central portion colored white, whereby the exposed portion of the wearer's sclera is cosmetically treated.

* * * * *